(12) United States Patent
Lim

(10) Patent No.: US 10,013,823 B2
(45) Date of Patent: Jul. 3, 2018

(54) VEHICLE INFORMATION PROCESSING SYSTEM AND METHOD

(71) Applicant: Samsung Electronics Co. Ltd., Suwon-si, Gyeonggi-do (KR)

(72) Inventor: Hun Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/021,442

(22) Filed: Sep. 9, 2013

(65) Prior Publication Data

US 2014/0074318 A1 Mar. 13, 2014

(30) Foreign Application Priority Data

Sep. 10, 2012 (KR) .................. 10-2012-0099782

(51) Int. Cl.
- *G07C 9/00* (2006.01)
- *H04L 29/06* (2006.01)
- *H04L 29/08* (2006.01)

(52) U.S. Cl.
CPC .......... *G07C 9/00007* (2013.01); *H04L 63/08* (2013.01); *H04L 63/104* (2013.01); *H04L 67/125* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 4,404,639 A * | 9/1983 | McGuire et al. | ............ 701/29.3 |
| 6,662,233 B1 | 12/2003 | Skarpness et al. | |
| 8,707,044 B2 | 4/2014 | Shim et al. | |
| 9,766,801 B2 | 9/2017 | Kato et al. | |
| 2003/0158640 A1* | 8/2003 | Pillar et al. | ...................... 701/33 |
| 2009/0265055 A1* | 10/2009 | Gillies | ........................... 701/29 |
| 2010/0037057 A1 | 2/2010 | Shim et al. | |
| 2010/0082230 A1 | 4/2010 | Hong et al. | |

(Continued)

FOREIGN PATENT DOCUMENTS

| CN | 1722621 A | 1/2006 |
|---|---|---|
| CN | 102063101 A | 5/2011 |

(Continued)

OTHER PUBLICATIONS

"Opel ADAM features infotainment with smartphone integration, ADAS tech." Telecmatics News, SBD, Aug. 2012.

(Continued)

*Primary Examiner* — John Olszewski
*Assistant Examiner* — Navid Ziaeianmehdizadeh
(74) *Attorney, Agent, or Firm* — Jefferson IP Law, LLP

(57) ABSTRACT

A vehicle information processing system performed by using an external apparatus and method are provided. The vehicle information processing method performed by using an external apparatus connected to a vehicle includes identifying a control authority of an external apparatus, which is connected to the vehicle, for communication between the external apparatus and the vehicle, transmitting service information that may be used according to the identified control authority, and executing a service, according to the transmitted service information, that is selected by the external apparatus, by using a processor which is included in the external apparatus.

11 Claims, 9 Drawing Sheets

(56) References Cited

U.S. PATENT DOCUMENTS

| | | |
|---|---|---|
| 2010/0125387 A1* | 5/2010 | Sehyun et al. .................. 701/36 |
| 2011/0227843 A1 | 9/2011 | Wang |
| 2011/0307188 A1 | 12/2011 | Peng et al. |
| 2012/0066419 A1 | 3/2012 | Park et al. |
| 2012/0191269 A1* | 7/2012 | Chen .................... G05D 1/0016 701/2 |
| 2012/0221173 A1* | 8/2012 | Ampunan et al. ................. 701/2 |
| 2012/0252364 A1* | 10/2012 | Inabathuni et al. ......... 455/41.2 |
| 2013/0013157 A1* | 1/2013 | Kim et al. ...................... 701/49 |
| 2017/0245097 A1 | 8/2017 | Chutorash et al. |

FOREIGN PATENT DOCUMENTS

| | | |
|---|---|---|
| CN | 102216731 A | 10/2011 |
| EP | 1 420 525 A1 | 5/2004 |
| JP | 2002-87184 A | 3/2002 |
| JP | 2008-72160 A | 3/2008 |
| JP | 2009-286343 A | 12/2009 |
| JP | 2010-514604 A | 5/2010 |
| JP | 2010-250416 A | 11/2010 |
| JP | 2012-500516 A | 1/2012 |
| KR | 10-0998654 B1 | 12/2010 |
| KR | 10-2012-0053895 A | 5/2012 |
| WO | 2012-036279 A1 | 3/2012 |

OTHER PUBLICATIONS

Beomtae, Lee. "Vehicle IT Convergence Technology for futuer services." TTA, Sep. 2, 2010.

Chulhwa Hong et al. "Evidence Collection from Car Black Boxes using Smartphones." IEEE. 2011.

H.W. Chun. "Technology and Service Trends of Smart Car." ETRI, Feb. 2012.

* cited by examiner

FIG. 6

| CERTIFICATION KEY | CONTROL AUTHORITY | SERVICE | APPARATUS | APPLICATION |
|---|---|---|---|---|
| A | MAIN USER | AUTOMATIC DRIVING SERVICE<br><br>VIDEO CLIP PLAY SERVICE | STEERING WHEEL, BRAKES, ACCELERATOR, CAMERA, DISPLAY APPARATUS, SPEAKER | AA<br><br>BB |
| B | SUB-USER | VIDEO CLIP PLAY SERVICE<br>NAVIGATION SERVICE | DISPLAY APPARATUS, SPEAKER | BB<br>DD |
| C | MAIN USER | DROWSY DRIVING PREVENTION ALARM SERVICE | STEERING WHEEL, BRAKES, CAMERA, DISPLAY APPARATUS, SPEAKER | CC |
| D | SUB-USER | NAVIGATION SERVICE | DISPLAY APPARATUS, SPEAKER | DD |

60 62 64 66 68

VEHICLE INFORMATION PROCESSING SYSTEM AND METHOD

CROSS-REFERENCE TO RELATED APPLICATION(S)

This application claims the benefit under 35 U.S.C. § 119(a) of a Korean patent application filed on Sep. 10, 2012 in the Korean Intellectual Property Office and assigned Serial No. 10-2012-0099782, the entire disclosure of which is hereby incorporated by reference.

TECHNICAL FIELD

The present disclosure relates to a system and a method of processing vehicle information by using an external apparatus.

BACKGROUND

As information technology is developing, a mobile electronic apparatus that performs multi-functions is being developed and being made smaller. Particularly, a mobile electronic apparatus, such as a smartphone or other similar portable and/or mobile electronic device, may perform a phone call and other various functions, such as a camera function, a Digital Multimedia Broadcasting (DMB) service, a navigation service, a music file play, a video file play, a game, and any other similar service that may be performed by the smartphone. A lifecycle of such a mobile electronic apparatus is gradually shortened, and specifications thereof are rapidly improving.

On the contrary, a vehicle terminal for performing various services, which are provided by a vehicle, is often manufactured to have low specifications, and a lifecycle of a vehicle is much longer than that of a mobile electronic apparatus. Consequently, the quantity and quality of services, provided by the vehicle, are limited. Therefore, in order to provide various vehicle services, there is a need for technology for effectively executing vehicle services via an external device of the vehicle while maintaining a security of the vehicle services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a vehicle information processing system and method, in which a service, provided by a vehicle, may be executed by using a processor of a device.

In accordance with an aspect of the present disclosure, a vehicle information processing method performed by using an external apparatus connected to a vehicle is provided. The method includes identifying a control authority of an external apparatus, which is connected to the vehicle, for communication between the external apparatus and the vehicle, transmitting service information that may be used according to the identified control authority, and executing a service, according to the transmitted service information, that is selected by the external apparatus, by using a processor which is included in the external apparatus.

In accordance with another aspect of the present disclosure, a vehicle information processing method performed by using an external apparatus is provided. The method includes determining that the external apparatus is connected to the vehicle for communication between the external apparatus and the vehicle, setting a control authority on an input apparatus and on an output apparatus that are included in the vehicle, the control authority corresponding to the external apparatus, and executing information processing by using a processor that is included in the external apparatus.

In accordance with another aspect of the present disclosure, a vehicle for a control authority identification unit configure to identify a control authority of an external apparatus for controlling communication between the external apparatus and the vehicle, and a service information providing unit configured to transmit service information that may be used according to the identified control authority, wherein the transmitted service information is used for executing, by a processor included in the external apparatus, the selected service.

In accordance with another aspect of the present disclosure, a terminal, which may be connected to a vehicle, which processes information by using an external apparatus, is provided. The terminal includes a connection unit configured to recognize that the external apparatus is communicatively connected to a vehicle, and a control authority setting unit configured to set a control authority on an input apparatus and an output apparatus, which are included in the vehicle, the control authority corresponding to the external apparatus, wherein processing of information, which corresponds to the set control authority, is performed by using a processor which is included in the external apparatus.

In accordance with another aspect of the present disclosure, a method in which a device executes a service which is provided by a vehicle is provided. The method includes receiving service information from the vehicle that is connected to the device so as to allow the device to communicate with the vehicle, selecting a predetermined service according to the received service information, and executing the selected service by using a processor of the device, wherein the service information is information about a service that is provided by the vehicle according to a control authority that matches the device.

In accordance with another aspect of the present disclosure, a method in which a device processes information that is provided. The method includes determining whether the device is communicably connected to the vehicle, receiving a request for processing information from the vehicle, and processing the requested information via a processor of the device, wherein a control authority on an input apparatus and an output apparatus, which are included in the vehicle, is set by the set control authority.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a control authority setting table according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

Hereinafter, various embodiments of the present disclosure will be described in detail with reference to the accompanying drawings.

Figure 1:
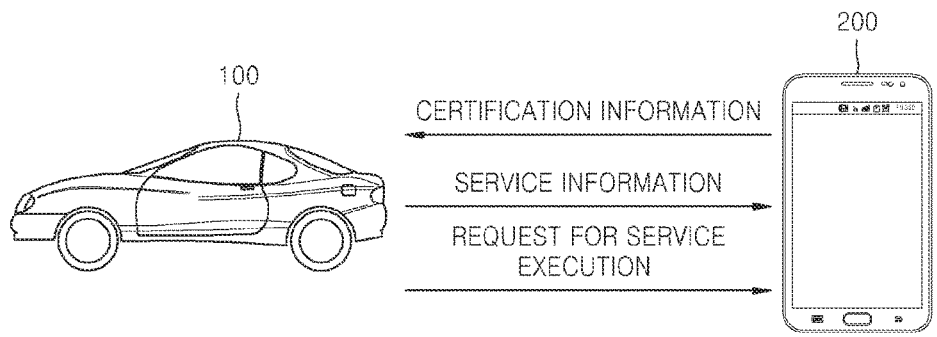
FIG. 1 is a diagram illustrating a system for processing information between a vehicle and a device, according to an embodiment of the present disclosure.

FIG. 1 is an outline diagram of a system for processing information between a vehicle and a device according to an embodiment of the present disclosure.

Referring to FIG. 1, according to an embodiment of the present disclosure, a device 200 is connected to a vehicle 100, and the device 200 may execute a service that is provided by the vehicle 100, such that the vehicle 100 does not execute the service. The vehicle 100 may receive certification information from the device 200, may determine a control authority of the device 200, and may provide predetermined service information to the device 200 according to the determined control authority. The service information may include, for example, a list of services that are provided by the vehicle 100 and a detailed explanation about the services. Additionally, the device 200 may select a predetermined service based on the received service information. Additionally, the vehicle 100 may provide at least one of apparatus information and application information, with regard to the selected service, to the device 200, and thus, the vehicle 100 may request the device 200 to execute the selected service. Accordingly, the vehicle 100 may employ at least one of a processor, a memory, a communication module, and any other similar and/or suitable hardware element or device, which are included in the device 200, so as to execute the service that is provided by the vehicle 100.

Additionally, in the description of the present disclosure, a service may include a service that may employ a function of the vehicle 100. For example, a service may be a service regarding safety of the vehicle 100 and a service regarding a convenience function provided by the vehicle 100, or any other similar and/or suitable service related to the vehicle 100. The service regarding safety of the vehicle 100 may include a service that provides at least one of an automatic vehicle driving function and a drowsy driving prevention function, or any other similar and/or suitable safety service for the vehicle 100. Additionally, the service regarding a convenience function provided by the vehicle 100 may include at least one of a function of adjusting an indoor temperature of the vehicle 100, a navigation function, a voice recognition function, a content play function, and a phone call function, or any other similar and/or suitable convenience function for the vehicle 100.

Additionally, the service may include a service of data sharing between the vehicle 100 and the device 200. The data sharing service may include, for example, a service in which the vehicle 100 and the device 200 share location information that is obtained by using a Global Positioning System (GPS), a service in which navigation destination information that is input by using a cellular phone is provided to the vehicle 100, and a service in which information about a status and driving of the vehicle 100 is provided to the device 200 and thus employed, or any other similar and/or suitable data sharing service.

Additionally, the service may include a service of media content sharing between the vehicle 100 and the device 200.

For example, the media content sharing service may include, for example, a service of sharing music or a video clip that is stored in the device 200, a service of controlling a function of the vehicle 100 by using a voice recognition function of the device 200, and a service of transmitting music or a video clip, which is stored in the device 200, to the vehicle 100 by using a streaming method, or any other similar and/or suitable service.

Additionally, the service may include a service of screen sharing between the vehicle 100 and the device 200. For example, the screen sharing service may include a service of displaying information, which is displayed on a screen of the device 200, on a display apparatus (not shown) that is included in the vehicle 100, or any other similar and/or suitable screen sharing service.

Additionally, the service may include a service of a connection between the vehicle 100 and the device 200. The service of the connection between the vehicle 100 and the device 200 may include, for example, an apparatus search service provided by using Universal Plug and Play (UPnP), and an apparatus connection service provided by using Universal Serial Bus (USB), Bluetooth, or Wireless-Fidelity (Wi-Fi) Direct, or any other similar and/or suitable connection service. Additionally, the service may include a service for controlling the vehicle 100 and the device 200.

Additionally, in the description of the present disclosure, the vehicle 100 is connected to the device 200, and the vehicle 100 requests the device 200 for service execution. However, the present disclosure is not limited thereto. In the description of the present disclosure, the vehicle 100 includes an apparatus that is additionally installed in a vehicle, as well as a head unit that is installed when the vehicle is manufactured.

Additionally, the device 200 may be a smartphone, a cellular phone, a Personal Digital Assistant (PDA), a media player, a GPS apparatus, a laptop computer, or other mobile or non-mobile computing apparatuses. However, the device 200 is not limited thereto and the device 200 may be any other similar and/or suitable electronic device.

Figure 2:
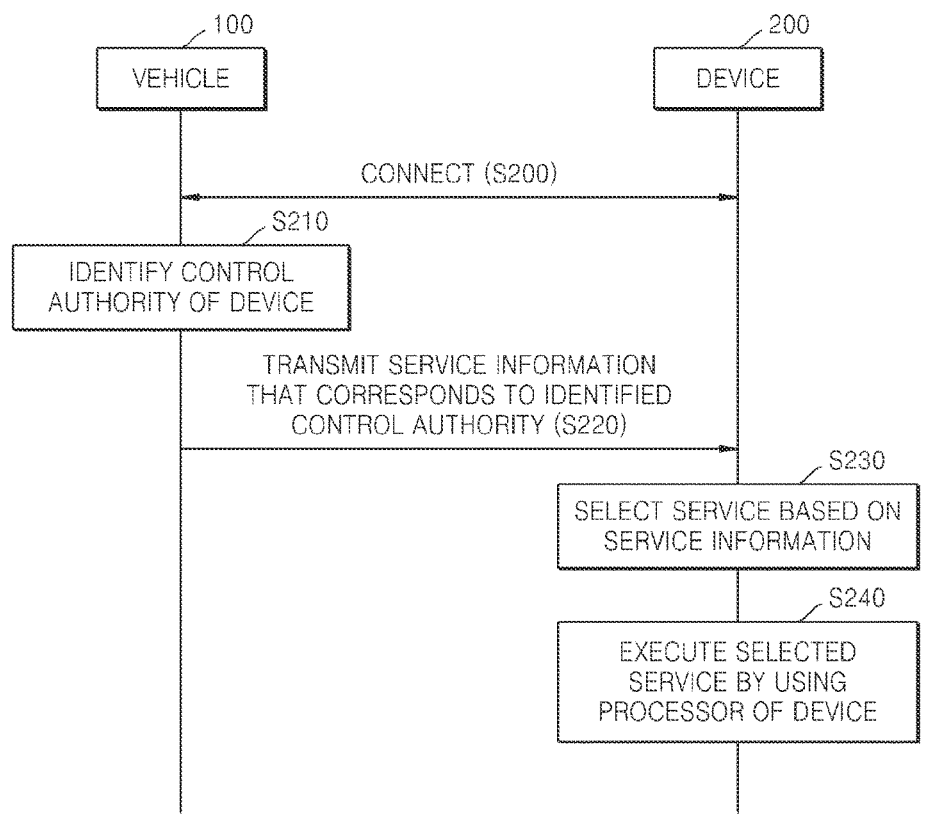
FIG. 2 is a flowchart illustrating a method in which a vehicle processes information of a device, according to an embodiment of the present disclosure.

FIG. 2 is a flowchart illustrating a method of in which a vehicle processes information of a device, according to an embodiment of the present disclosure.

In operation S200, the device 200 and the vehicle 100 are connected so as to communicate with each other. In operation S200, the device 200 may be inserted into a slot that is located near a dashboard, or any other suitable location, of the vehicle 100, and thus, connected to the vehicle 100. In this case, for example, the device 200 may be connected to the vehicle 100 via a direct and/or physical connection, such as wires, via at least one of a USB interface and a High-Definition Multimedia Interface (HDMI). However, the embodiments of the present disclosure are not limited thereto, and the device 200 may be connected to the vehicle 100 via wireless communication, a wireless connection, or any other similar and/or suitable wired or wireless manner. For example, the device 200 may be connected to the vehicle 100 via Wi-Fi communication or Bluetooth communication.

In operation S210, the vehicle 100 identifies a control authority of the device 200. The vehicle 100 may receive certification information from the device 200 and may identify a control authority that corresponds to the received certification information. The certification information may include, for example, apparatus information, user information, and an identification value that is pre-issued to the device 200 by the vehicle 100. However, the certification information is not limited thereto, and the certification information may include any other similar and/or suitable information. Additionally, an identification value, which is pre-issued to the device 200 by the vehicle 100, may be classified according to a control authority of the device 200. The identification value, which is pre-issued to the device 200 by the vehicle 100, may be classified, for example, into "a main user" and "a sub-user". Additionally, an identification value, which is pre-issued to the device 200 by the vehicle 100, may be classified, for example, into "a vehicle owner", "a driver 1", "a driver 2", "a passenger", and any other similar and/or suitable identity type. The control authority refers to an authority for controlling access to the service that is provided by the vehicle 100 and an authority for controlling a device that is included in the vehicle 100 in order to execute the service. Additionally, the service may be classified into a service regarding safety of the vehicle 100 and a service regarding a convenience function that is provided by the vehicle 100. The service regarding safety of the vehicle 100 may include a service that provides at least one of an automatic vehicle driving function and a drowsy driving prevention function. Additionally, the service regarding a convenience function, provided by a vehicle, may include at least one from among a function of adjusting an indoor temperature of the vehicle, a navigation function, a voice recognition function, a content play function, a phone call function, and any other similar and/or suitable function.

Additionally, the certification information may be generated by the vehicle 100 and provided to the device 200 in advance. The vehicle 100 may pre-match the generated certification information with a control authority. For example, the vehicle 100 may match a control authority for the service regarding safety of the vehicle 100 and the service regarding a convenience function provided by the vehicle 100, with regard to certification information about the device 200 of a main user of the vehicle 100. Additionally, the vehicle 100 may match a control authority to the service regarding a convenience function provided by the vehicle 100, with regard to certification information about the device 200 of a sub-user of the vehicle 100. The main user of the vehicle 100 may be a person who has an authority to drive the vehicle 100. For example, the main user of the vehicle 100 may be an owner of the vehicle 100. Additionally, the sub-user of the vehicle 100 may be a person who does not have an authority to drive the vehicle 100, for example, an acquaintance of the owner of the vehicle 100.

In operation S220, the vehicle 100 provides service information, the service information being about a service that corresponds to the identified control authority, to the device 200. The vehicle 100 may generate a list of services that correspond to the control authority, and provide the generated list of services to the device 200. In this case, the list of services may be converted into a format which is appropriate for the device 200. For example, the vehicle 100 may provide a list of services regarding safety of the vehicle 100 and a list of services regarding a convenience function, which is provided by the vehicle 100, to the device 200 of a main user. Additionally, for example, the vehicle 100 may provide only the list of services regarding a convenience function which is provided by the vehicle 100 to the device 200 of a sub-user.

In operation S230, the device 200 selects a predetermined service based on the received service information. The device 200 may select a predetermined service from the list of services that is received from the vehicle 100.

In operation S240, the device 200 executes the selected service by using a processor of the device 200. The device 200 may receive information, which is used for executing the selected service, from the vehicle 100. The device 200 may receive application information and apparatus information of the vehicle 100, which are used for executing the selected service. For example, if a service, selected by the device 200, is an automatic driving service, the device 200 may receive an application for automatic driving from the vehicle 100. Additionally, the device 200 may receive information about a steering wheel, an accelerator, brakes, a gear transmission apparatus, a display apparatus (not shown), a speaker (not shown), and any other similar and/or suitable elements of the vehicle 100, as apparatus information of the vehicle 100, which is used for executing an automatic driving service. Additionally, the device 200 may execute an automatic driving application that is received from the vehicle 100, and the device 200 may control a steering wheel, an accelerator, brakes, a gear transmission apparatus, a display apparatus, a speaker, and any other similar and/or suitable elements of the vehicle 100, via the executed application.

Figure 3:
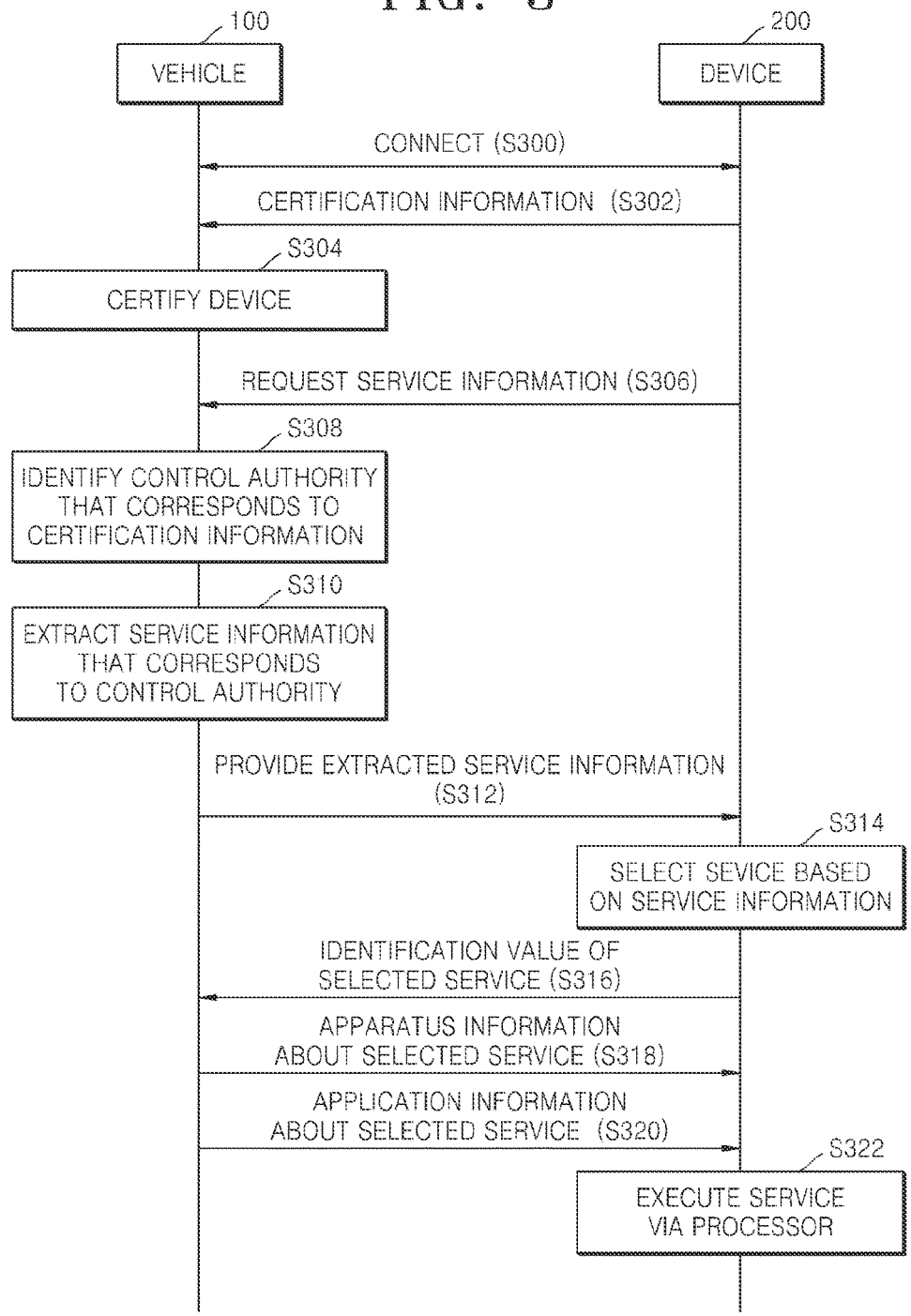
FIG. 3 is a flowchart illustrating a method of in which a vehicle processes information of a device, according to an embodiment of the present disclosure.

FIG. 3 is a detailed flowchart illustrating a method in which a vehicle processes information of a device, according to an embodiment of the present disclosure.

In operation S300, the vehicle 100 and the device 200 are connected so as to communicate with each other. In operation S300, the device 200 may be inserted into a slot located near a dashboard of the vehicle 100, or any other suitable and/or similar location of the vehicle 100, and thus, the device 200 is connected to the vehicle 100. In this case, the device 200 may be connected to the vehicle 100 via wires, for example, via at least one of a USB interface and HDMI. Additionally, the device 200 may be connected to the vehicle 100 via wireless communication. For example, the device 200 may be connected to the vehicle 100 via Wi-Fi communication or Bluetooth communication.

In operation S302, the vehicle 100 receives certification information from the device 200. The certification information may be pre-issued, by the vehicle 100, to the device 200 and stored in the device 200. As the device 200 and the vehicle 100 are connected to each other, the certification information may be provided to the vehicle 100 by the device 200.

Specifically, the vehicle 100 may request the device 200 for certification information, and in a response to the request, the device 200 may provide the certification information to the vehicle 100. The vehicle 100 may provide an IDentification (ID) of the vehicle 100 to the device 200, and the device 200 may transmit certification information, which corresponds to the ID of the vehicle 100, to the vehicle 100. The certification information is used for certifying the device 200 or a user of the device 200. For example, the certification information may include at least one from among an ID of the device 200, a user ID, and a certification key.

If the device 200 does not include a pre-issued certification key, then the device 200 may provide an empty key to the vehicle 100. Then, the device 200 may receive an additional certification key issued from the vehicle 100. If the device 200 includes a pre-issued certification key, then the device 200 may transmit the pre-issued certification key to the vehicle 100 through a predetermined procedure. For example, as a predetermined certification key is selected in the device 200, the device 200 may receive an input of a password from a user. Additionally, the device 200 may determine whether the received password matches a preset password. If the received password matches a preset password, then the device 200 may transmit the selected certification key. In operation S304, the vehicle 100 certifies the device 200. The vehicle 100 may certify the device 200 by using certification information that is received from the device 200. For example, the vehicle 100 may certify the device 200 by comparing the certification information, which is received from the device 200, to the certification information, which is pre-issued by the vehicle 100, so as to check whether the received certification information and the pre-issued certification information are identical.

In operation S306, the device 200 requests the vehicle 100 for service information. The device 200 may execute a service that is provided by the vehicle 100 instead of the vehicle 100 executing the service. Before executing the service, the device 200 may request the vehicle 100 for information about a service which may be executed by the device 200.

In operation S308, based on the received certification information, the vehicle 100 identifies a control authority that corresponds to the certification information. A control authority refers to an authority for controlling access to a service that is provided by the vehicle 100 and an authority for controlling an apparatus that is included in the vehicle 100 in order to execute the service. Additionally, the service may be classified into a service regarding safety of a vehicle and a service regarding a convenience function that is provided by the vehicle 100. The service regarding safety of the vehicle 100 may include a service that provides at least one of an automatic vehicle driving function and a drowsy driving prevention function. Additionally, the service regarding a convenience function, provided by a vehicle, may include at least one from among a function of adjusting an indoor temperature of the vehicle 100, a navigation function, a voice recognition function, a content play function, and a phone call function. Additionally, a service regarding safety of the vehicle 100 and a service regarding a convenience function of the vehicle 100 may be pre-classified according to a user input, and stored in the vehicle 100, but the service regarding safety of the vehicle 100 and the service regarding a convenience function of the vehicle 100 are not limited thereto, and they may be any suitable and/or similar service.

Additionally, the control authority, which corresponds to certification information, may be pre-matched by the vehicle 100. For example, the vehicle 100 may match a control authority to the service regarding safety of the vehicle 100 and the service regarding a convenience function provided by the vehicle 100, with regard to certification information about the device 200 of a main user of the vehicle 100. Additionally, the vehicle 100 may match a control authority to the service regarding a convenience function provided by the vehicle 100, with regard to certification information about the device 200 of a sub-user of the vehicle 100. The main user of the vehicle 100 may be a person who has an authority to drive the vehicle 100. For example, the main user of the vehicle 100 may be an owner of the vehicle 100 or any other similar and/or suitable driver of the vehicle 100. Additionally, the sub-user of the vehicle 100 may be a person who does not have an authority to drive the vehicle 100, for example, an acquaintance of the owner of the vehicle 100 or any other similar and/or suitable person that does not have the authority to drive the vehicle 100. A control authority, which matches the certification information, will be described in detail, with regard to FIG. 6.

In operation S310, the vehicle 100 extracts service information that corresponds to the identified control authority. The vehicle 100 may extract a list of services, which corresponds to the identified control authority, from a database (DB) (not illustrated). For example, the vehicle 100 may check that a control authority, which corresponds to a certification key 'A', is a control authority of a main user, and extract a list of services including 'an automatic driving service' and 'a video clip play service'. Additionally, for example, the vehicle 100 may determine that a control authority, which corresponds to a certification key 'B', is a control authority of a sub-user, and may extract a list of services including 'a video clip play service' and 'a navigation service'.

In operation S312, the vehicle 100 provides information about the extracted services to the device 200. The vehicle 100 may convert the extracted service list into a format that is appropriate for a protocol of the device 200, and provide the converted service list to the device 200.

In operation S314, the device 200 selects a service based on the service information. The device 200 may display the service information that is received from the vehicle 100, and may select a predetermined service based on a user input. For example, based on service information that is received from the vehicle 100, the device 200 may display a service list that includes 'an automatic driving service' and 'a video clip play service', and may select 'an automatic driving service' based on a user input. Otherwise, for example, based on service information that is received from the vehicle 100, the device 200 may display a service list that includes 'a video clip play service' and 'a navigation service', and may select 'a video clip play service' based on a user input.

In operation S316, the device 200 provides an ID value of the selected service to the vehicle 100. The device 200 may provide a name or an ID of the selected service to the vehicle 100.

In operation S318, the vehicle 100 provides apparatus information about the selected service to the device 200. With regard to the service that is provided by the vehicle 100, various apparatuses in the vehicle 100 may be used. For example, apparatuses, such as a steering wheel, brakes, an accelerator, a camera, a display apparatus, a speaker, an input apparatus and any other similar and/or suitable apparatus may be used. The vehicle 100 may extract information about an apparatus, which is used for providing a service that is selected by the device 200, from the DB, and the vehicle 100 may provide the extracted apparatus information to the device 200. For example, if a service, which is selected by the device 200, is 'an automatic driving service', then the vehicle 100 may provide information about a steering wheel, brakes, an accelerator, a camera, a display apparatus, a speaker, or any other similar and/or suitable apparatus or element of the vehicle 100 to the device 200. Additionally, if a service which is selected by the device 200 is 'a video clip play service', then the vehicle 100 may provide information about a display apparatus or a speaker to the device 200. Accordingly, the device 200 may receive apparatus information which corresponds to a control authority of the device 200, and may obtain a control authority corresponding to an apparatus that is included in the received apparatus information. Additionally, the device 200 may employ and control the apparatus, which is included in the received apparatus information, as an external resource of the device 200. That is, the device 200 may recognize the apparatus, which is included in the received apparatus information, as an external apparatus that is connected to the device 200. However, an apparatus, which is recognized as an external apparatus, is not limited thereto.

In operation S320, the vehicle 100 provides application information about the selected service to the device 200. The vehicle 100 may provide an application file, which is used for executing the selected service, to the device 200. However, the present disclosure is not limited thereto, and the vehicle 100 may provide predetermined link information to the device 200, so that the device 200 may download an application file that is used for executing the selected service.

In operation S322, the device 200 executes a service via a processor of the device 200. The device 200 may execute an application for the selected service and control apparatuses in the vehicle 100 via the executed application. For example, if a service, selected by the device 200, is 'an automatic driving service', the device 200 may execute an application 'AA' for an automatic driving service, and the device 200 may control a steering wheel, brakes, an accelerator, and a camera in the vehicle 100. Additionally, the device 200 may output information about vehicle being driven via a display apparatus or a speaker in the vehicle 100.

Additionally, for example, if a service which is selected by the device 200 is 'a video clip play service', the device 200 may execute an application 'BB' for a video clip play service, and output a result of video clip play via a display apparatus or a speaker in the vehicle 100.

Additionally, an additional agent for executing a service of the vehicle 100 may be installed in the device 200. The agent may determine whether the device 200 is in a mode of providing a vehicle service. Additionally, the agent may recognize an apparatus, included in the vehicle 100, as an external resource that is connected to the device 200, and the agent may manage an internal resource and an external resource of the device 200 together. Additionally, when a service of the vehicle 100 is executed, the agent may output a result of the service execution via an apparatus that is included in the vehicle 100.

Figure 4:
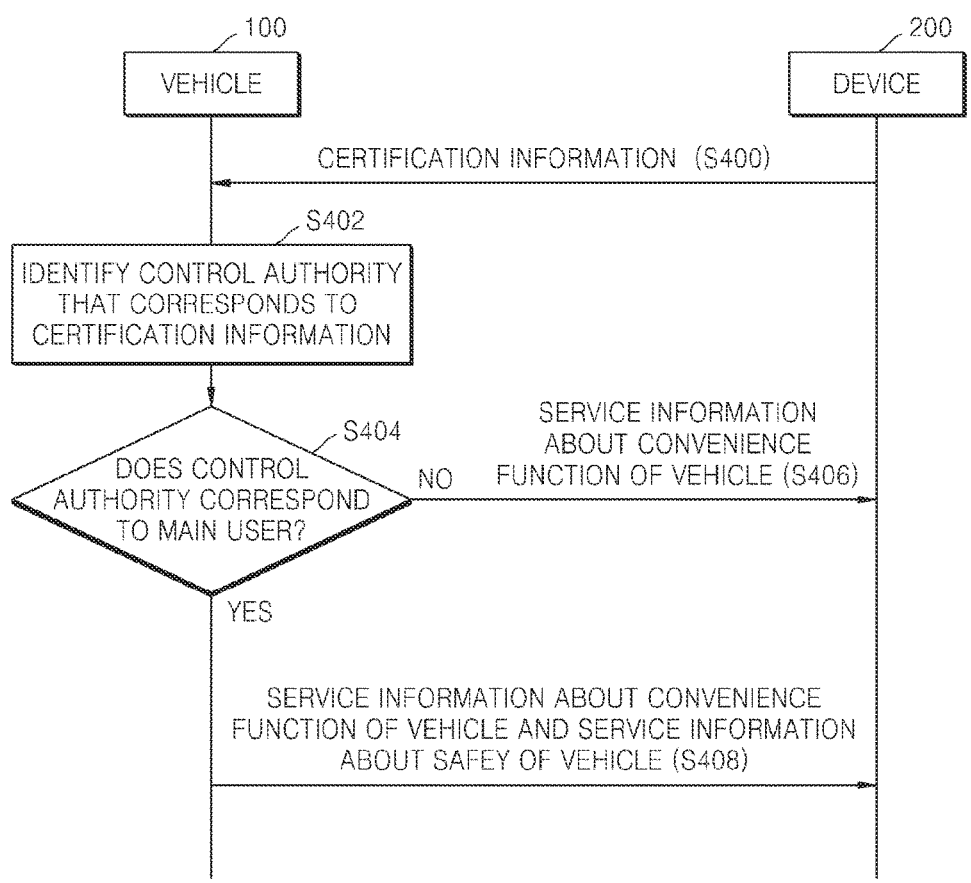
FIG. 4 is a flowchart illustrating a method in which a vehicle provides information to a device, according to an embodiment of the present disclosure.

FIG. 4 is a detailed flowchart illustrating a method in which a vehicle provides information to a device, according to an embodiment of the present disclosure.

In operation S400, the device 200 provides certification information to the vehicle 100. The certification information may be pre-issued to the device 200, and stored in the device 200. As the vehicle 100 and the device 200 are connected to each other, the device 200 may provide the certification information to the vehicle 100. Specifically, the vehicle 100 requests the device 200 for certification information and, in response to the request, the device 200 may provide the certification information to the vehicle 100. The certification information is for certifying the device 200 or a user of the device 200. For example, the certification information may include at least one of an ID of the device 200, a user ID, a certification key, or any other similar and/or suitable type of information.

In operation S402, the vehicle 100 identifies a control authority that corresponds to the received certification information. In operation S402, the vehicle 100 may certify the device 200 by using the received certification information and check for a control authority that corresponds to the received certification information. The control authority refers to an authority for controlling access to the service that is provided by the vehicle 100 and an authority for controlling an apparatus that is included in the vehicle 100 in order to execute the service. Additionally, the service may be classified into a service regarding safety of the vehicle 100 and a service regarding a convenience function that is provided by the vehicle 100. Additionally, the control authority, which corresponds to the certification information, may be pre-matched by the vehicle 100.

In operation S404, the vehicle 100 determines whether the identified control authority is a control authority that corresponds to a main user. The main user of the vehicle 100 may be a person who has an authority to drive the vehicle 100. For example, the main user of the vehicle 100 may be an owner of the vehicle 100. A person who is not a main user may be a person who does not have an authority to drive the vehicle 100, for example, an acquaintance of the owner of the vehicle 100.

As a result of the determination in operation S404, if the identified control authority is not the control authority that corresponds to a main user, then, in operation S406, the vehicle 100 provides only service information about the convenience function of the vehicle 100 to the device 200. The service regarding a convenience function, provided by a vehicle, may include at least one from among a function of adjusting an indoor temperature of the vehicle 100, a navigation function, a voice recognition function, a content play function, and a phone call function. Additionally, the vehicle 100 may provide a list of services, regarding a convenience function of the vehicle 100, to the device 200.

As a result of the determining in operation S404, if the identified control authority is the control authority that corresponds to a main user, then the vehicle 100 provides service information about a convenience function of the vehicle 100 and service information about safety of the vehicle 100 to the device 200, in operation S408. The service regarding safety of the vehicle 100 may include, for example, a service that provides at least one of an automatic vehicle driving function and a drowsy driving prevention function. The service regarding safety of the vehicle 100 and the service regarding a convenience function of the vehicle 100 may be pre-classified according to a user input, and stored in the vehicle 100, but the service is not limited thereto. Additionally, in operation S408, the vehicle 100 may provide a service list of the service about safety of the vehicle 100 and the service about a convenience function of the vehicle 100 to the device 200.

Figure 5:
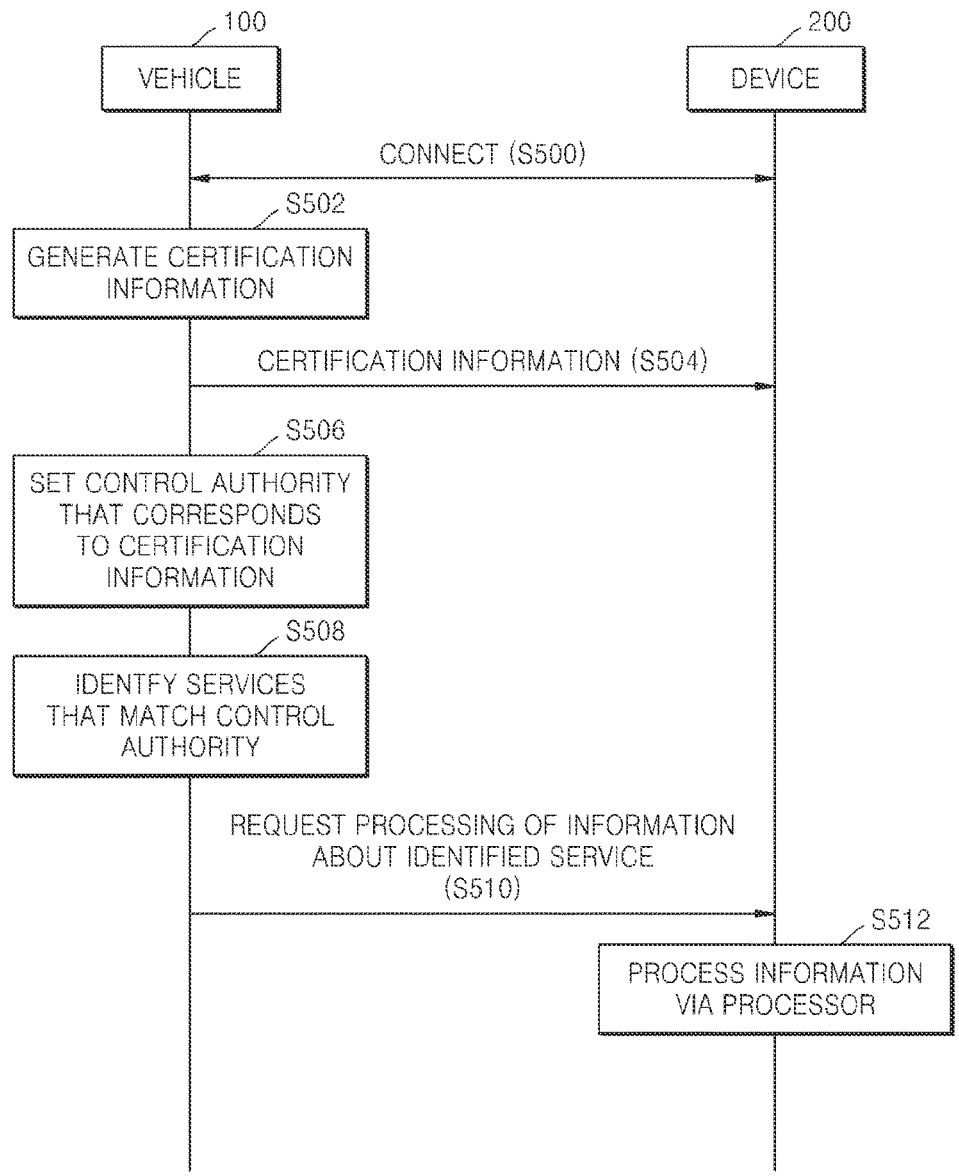
FIG. 5 is a flowchart illustrating a method in which a vehicle sets a control authority, with regard to a device, and processing information, via the device, according to an embodiment of the present disclosure.

FIG. 5 is a flowchart illustrating a method in which a vehicle sets a control authority with regard to a device, and processing information via the device, according to an embodiment of the present disclosure.

In operation S500, a device 200 and a vehicle 100 are connected so as to communicate with each other. In operation S500, the device 200 may be inserted into a slot, or any other similar and/or suitable location, located near a dashboard of the vehicle 100, and thus, the device 200 is connected to the vehicle 100. In this case, for example, the device 200 may be connected to the vehicle 100 via wires, via at least one of a USB interface and HDMI. Additionally, the device 200 may be connected to the vehicle 100 via wireless communication. For example, the device 200 may be connected to the vehicle 100 via Wi-Fi communication or Bluetooth communication.

In operation S502, the vehicle 100 generates certification information. If the device 200 is connected to the vehicle 100 at first, then the vehicle 100 may generate certification information about the device 200 in response to a certification request from the device 200. For example, the vehicle 100 may generate a login ID and a password with regard to the device 200. Additionally, for example, the vehicle 100 may generate a certification key for the device 200 by using a random number. Additionally, for example, the vehicle 100 may generate at least one of a public key and a private key as a certification key for the device 200.

Additionally, the certification information may include a predetermined identification value. In this case, the identification value may include information about a control authority. The identification value may be classified, for example, into "a main user" and "a sub-user". Additionally, the identification value may be classified, for example, into "a vehicle owner", "a driver 1", "a driver 2", and "a passenger".

In operation S504, the vehicle 100 provides the generated certification information to the device 200. The vehicle 100 may store the generated certification information in the DB (not illustrated) of the vehicle 100, and provide the generated certification information to the device 200. Additionally, when a predetermined password is input by a user, the device 200 may store the certification information that is received from the vehicle 100.

In operation S506, the vehicle 100 sets a control authority that corresponds to the certification information. The vehicle 100 may match a control authority to at least one of the services, which are provided by the vehicle 100, with the certification information. For example, the control authority may be classified into a control authority of a main user and a control authority of a sub-user, and be matched with the certification information. Additionally, for example, a control authority may be matched with regard to a combination of services that are provided by the vehicle 100. For example, the vehicle 100 may match a control authority, which may control an automatic vehicle driving function and a drowsy driving prevention function from among a function of adjusting an indoor temperature of the vehicle, a navigation function, a voice recognition function, a content play function, a phone call function, and any other similar and/or suitable functions that are provided by the vehicle 100, with the certification information.

In operation S508, the vehicle 100 checks for a service regarding the set control authority. The vehicle 100 may identify services that match the control authority in operation S506.

In operation S510, the vehicle 100 requests the device 200 to process information about the identified services. In operation S510, the vehicle 100 may provide a list of the identified services to the device 200. Additionally, the vehicle 100 may provide information about an apparatus in the vehicle 100 which is necessary for processing information about the service that was identified, and information about an application which is used for processing information about the service that was identified for to the device 200. The apparatus in the vehicle 100 may include, for example, a steering wheel, brakes, an accelerator, a camera, a display apparatus, a speaker, and any other similar and/or suitable apparatus that may be in the vehicle 100. Additionally, the information about an application may include an application file and a link address for downloading the application file, however, the information about an application is not limited thereto and may be any similar and/or suitable type of information.

In operation S510, the vehicle 100 may also request the device 200 to process information about a service which is selected by the device 200 from among the identified services. In this case, the vehicle 100 may provide a list of the services that were identified for to the device 200, and may receive an identification value of the selected service from the device 200.

In operation S512, the device 200 processes information via a processor of the device 200. In operation S512, the device 200 may execute an application for processing information about the service that was identified by using the processor of the device 200, and may control an apparatus in the vehicle 100 by using the executed application.

FIG. 6 is an example of a control authority setting table according to an embodiment of the present disclosure.

Referring to FIG. 6, according to an embodiment of the present disclosure, the control authority setting table includes a certification key field 60, a control authority field 62, a service field 64, an apparatus field 66, and an application field 68.

In the certification key field 60, an identification value of a certification key, which is generated by the vehicle 100, is recorded. In the control authority field 62, an attribute value of a control authority that corresponds to a certification key may be recorded. For example, 'a main user' or 'a sub-user' may be recorded in the control authority field 62. In the service field 64, an identification value of a service, which corresponds to a control authority, may be recorded. For example, at least one value from among 'an automatic driving service, 'a video clip play service', 'a navigation service', and 'a drowsy prevention alarm service' may be recorded in the service field 64.

In the apparatus field 66, an apparatus value of an apparatus in the vehicle 100, which is used for executing a service that is recorded in the service field 64, is recorded. In the apparatus field 66, for example, at least one value from among 'a steering wheel', 'brakes', 'an accelerator', 'a camera', and 'a display apparatus', may be recorded. In the application field 68, an identification value, which is used for executing a service that is recorded in the service field 64, may be recorded.

Additionally, a limit may be set in detail for each service. For example, a range of a driving speed of an automatic driving service may be set for each control authority, and automatic driving may be executed within the set range of a driving speed. Additionally, for example, a search area for the navigation service may be set for each control authority, and a search for a route guide may be executed for the set search area. Additionally, a control authority may be set, for example, according to types of contents that are shared via a service.

A service use authority of a main user and a sub-user may be variously set for each service that is provided to the vehicle 100 and the device 200. For example, an authority for using location information of the vehicle 100, which is obtained from the vehicle 100, an authority for setting a destination of a navigation apparatus of the vehicle 100, an authority for making a phone call from the device 200 to the vehicle 100, an authority for using a speaker of the vehicle 100, an authority for streaming music or a video clip of the device 200 to the vehicle 100, an authority for displaying a screen of the device 200 on a display apparatus of the vehicle 100, an authority for searching for a function of the vehicle 100, and an authority for accessing a function of the vehicle 100 that was searched for, or any other similar and/or suitable authority for any similar and/or suitable service may be set variously according to users. Additionally, an authority for accessing an On-Board Diagnostic (OBD) system of the vehicle 100 may be set variously according to users.

Figure 7:
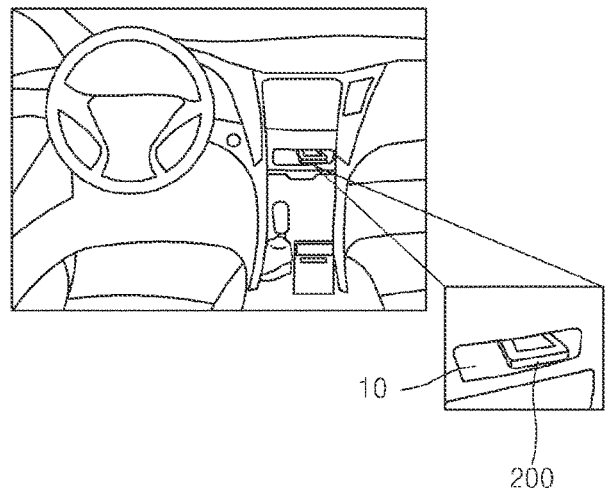
FIG. 7 is a diagram illustrating connecting a device to a vehicle, according to an embodiment of the present disclosure.

FIG. 7 is a diagram illustrating an example of connecting a device to a vehicle, according to an embodiment of the present disclosure.

Referring to FIG. 7, a device 200 may be inserted into a slot 10, located near a dashboard of the vehicle 100, and thus, the device 200 may be connected to the vehicle 100. In this case, an additional connection terminal (not illustrated) for connecting the vehicle 100 to the device 200 may be included in the slot 10. The device 200 may be connected to the vehicle 100 via wires, via at least one of a USB interface and HDMI. However, the present disclosure is not limited thereto, and the device 200 may be connected to the vehicle 100 via wireless communication. For example, the device 200 may be connected to the vehicle 100 via Wi-Fi communication or Bluetooth communication.

Figure 8:
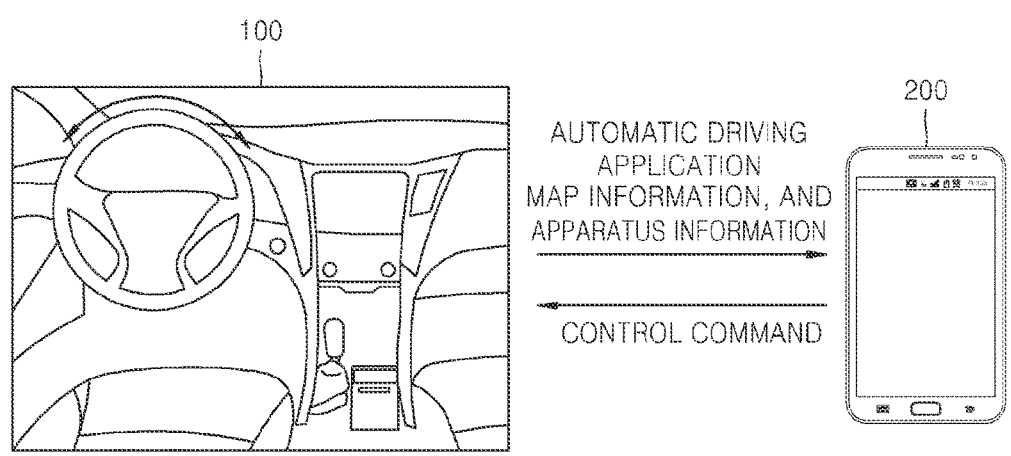
FIG. 8 is a diagram illustrating a vehicle executing an automatic driving service of a device, according to an embodiment of the present disclosure.

FIG. 8 is a diagram illustrating an example in which a vehicle executes an automatic driving service of a device, according to an embodiment of the present disclosure.

Referring to FIG. 8, a vehicle 100 may provide an application and map information for an automatic driving service to a device 200. Additionally, the vehicle 100 may provide information about an apparatus, which is used for automatic driving of the vehicle 100, to the device 200. For example, the vehicle 100 may provide information about a steering wheel, brakes, an accelerator, a camera, a display apparatus, or a speaker to the device 200. The vehicle 100 may provide information about a control command for controlling apparatuses in the vehicle 100 to the device 200. In this case, the vehicle 100 may set a control authority, so that the device 200 may control an apparatus that is included in the apparatus information, which is provided to the device 200 by the vehicle 100.

Additionally, the device 200 may execute an application that is received from the vehicle 100, and may control an apparatus in the vehicle 100 by using the executed application. The device 200 may drive the vehicle 100 by controlling brakes, a steering wheel, an accelerator, and any other similar and/or suitable apparatus for controlling the vehicle 100.

Figure 9:
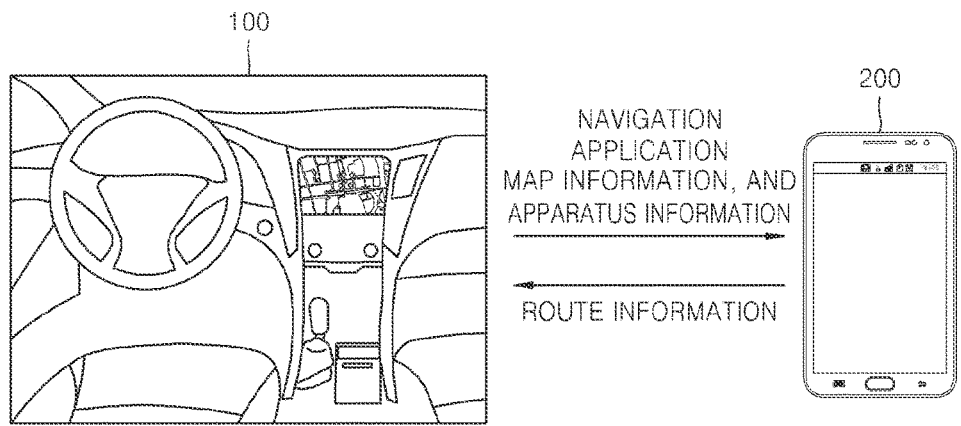
FIG. 9 is a diagram illustrating a vehicle executing a navigation service of a device, according to an embodiment of the present disclosure.

FIG. 9 is a diagram illustrating an example in which a vehicle executes a navigation service of a device, according to an embodiment of the present disclosure.

Referring to FIG. 9, a vehicle 100 may provide an application and map information for a navigation service to a device 200. Additionally, the vehicle 100 may provide information about an apparatus, which may output a result of executing the navigation service, to the device 200. For example, the vehicle 100 may provide information about a display apparatus or a speaker to the device 200.

In this case, the vehicle 100 may set a control authority, so that the device 200 may control an apparatus that is included in the information about an apparatus which is provided to the device 200 by the vehicle 100.

Additionally, the device 200 may execute an application that is received from the vehicle 100, and output information of a route to a destination via an apparatus of the vehicle 100, by using the executed application. The device 200 may control a display apparatus and a speaker in the vehicle 100, so as to output route information of the vehicle 100 to the vehicle 100. However, the present disclosure is not limited thereto, and the device 200 may provide only the route information, or any other similar and/or suitable type or combination of information to the vehicle 100, without having to additionally control the vehicle 100.

Figure 10:
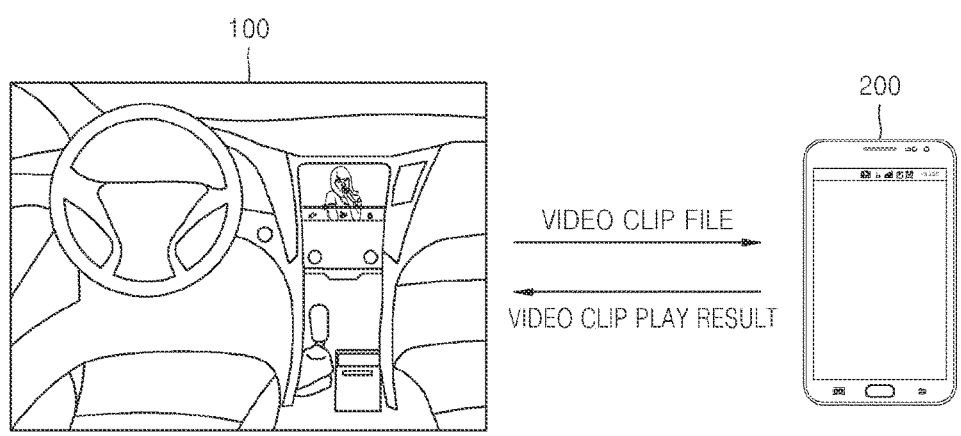
FIG. 10 is a diagram illustrating connecting of a device to a vehicle, according to an embodiment of the present disclosure.

FIG. 10 is a diagram illustrating an example of connecting a device to a vehicle, according to an embodiment of the present disclosure.

Referring to FIG. 10, a vehicle 100 may provide a video clip file for a video play service to a device 200. Additionally, the vehicle 100 may provide information about an apparatus, which may output a result of a video clip play, to the device 200. For example, the vehicle 100 may provide information about a display apparatus or a speaker to the device 200. In this case, the vehicle 100 may set a control authority so that the device 200 may control an apparatus that is included in the apparatus information, which is provided to the device 200 by the vehicle 100.

Additionally, the device 200 may play a video clip that is received from the vehicle 100, and output a result of the play of a video clip via an apparatus of the vehicle 100. The device 200 may control a display apparatus and a speaker in the vehicle 100, so as to output the result of the video clip play to the vehicle 100. However, the present disclosure is not limited thereto, and the device 200 may provide only the result of the video clip play to the vehicle 100, or any other similar and/or suitable type or combination of information, without having to additionally control the vehicle 100.

Figure 11:
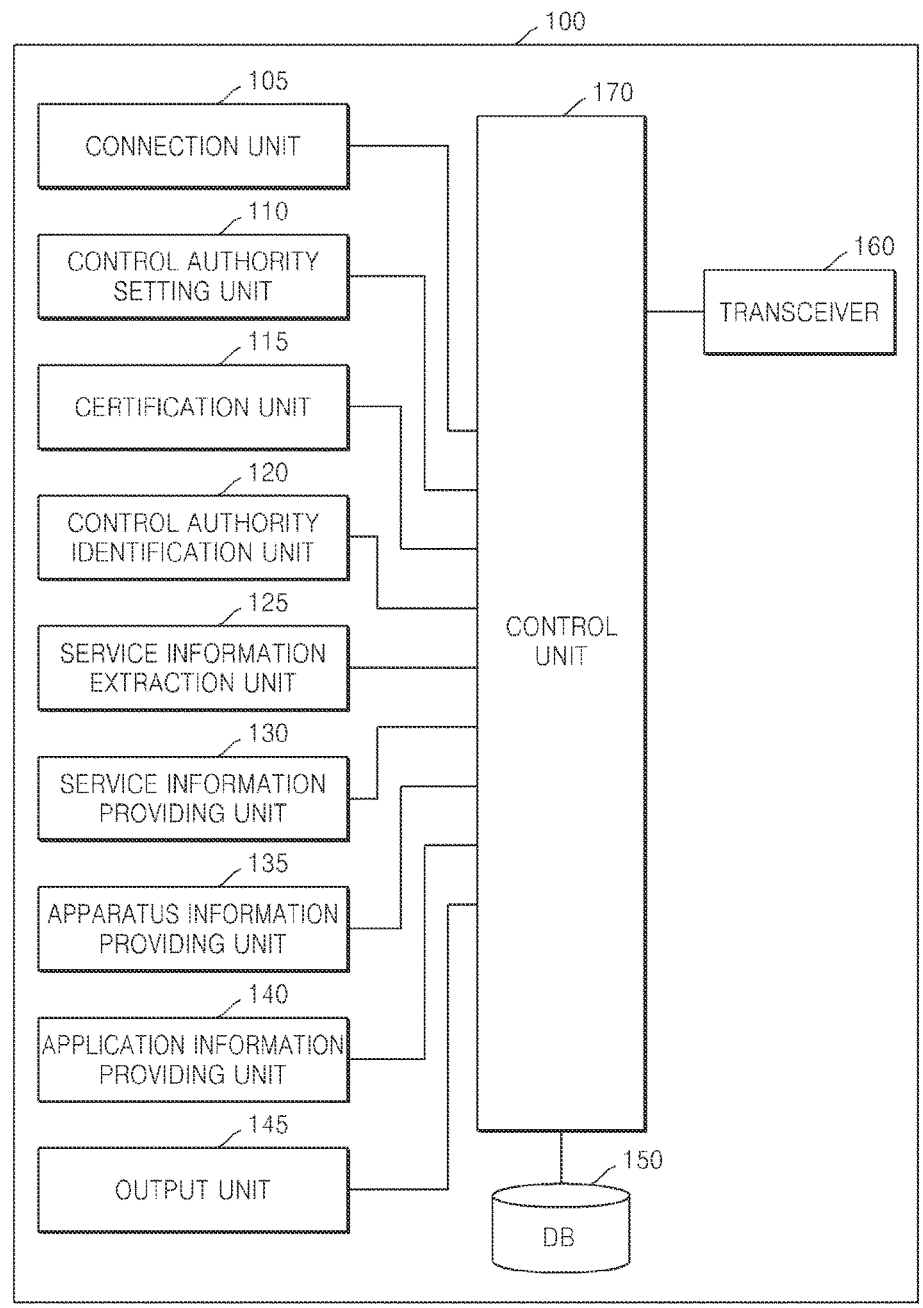
FIG. 11 is a block diagram of a vehicle according to an embodiment of the present disclosure.

FIG. 11 is a block diagram of a vehicle according to an embodiment of the present disclosure.

Referring to FIG. 11, according to an embodiment of the present disclosure, a vehicle 100 includes a connection unit 105, a control authority setting unit 110, a certification unit 115, a control authority identification unit 120, a service information extraction unit 125, a service information providing unit 130, an apparatus information providing unit 135, an application information providing unit 140, an output unit 145, a DB 150, a transceiver 160, and a control unit 170. However, the present disclosure is not limited thereto, and the vehicle 100 may include any other elements and/or devices that may be used to operate and/or be included in the vehicle 100.

The connection unit 105 connects the device 200 to the vehicle 100 for so that the device 200 and the vehicle 100 may communicate. When the device 200 is inserted into a part of the vehicle 100, such as a slot located near a dashboard, or located near any other suitable and/or similar part of the vehicle 100, the connection unit 105 may connect the device 200 to the vehicle 100. In this case, the connection unit 105 may connect the device 200 to the vehicle 100 via wires, for example, via at least one of a USB interface and HDMI. Additionally, the connection unit 105 may connect the device 200 to the vehicle 100 via wireless communication. For example, the connection unit 105 may connect the device 200 to the vehicle 100 via Wi-Fi communication or Bluetooth communication.

The certification unit 115 certifies the device 200 that is connected to the vehicle 100. The certification unit 115 may certify the device 200 by using certification information that is received from the device 200. For example, the certification unit 115 may certify the device 200 by comparing the certification information, which is received from the device 200, to the certification information, which is pre-issued by the vehicle 100, so as to determine whether the received certification information matches the pre-issued certification information.

The control authority setting unit 110 sets a control authority that corresponds to the certification information. The control authority setting unit 110 may match a control authority to at least one of the services, which are provided by the vehicle 100, with the certification information. For example, a control authority may be classified into a control authority of a main user and a control authority of a sub-user, and may be matched with the certification information. Additionally, for example, a control authority may be matched with regard to a combination of services that are provided by the vehicle 100. For example, the control authority setting unit 110 may match a control authority, which may control an automatic vehicle driving function and a drowsy driving prevention function from among a function of adjusting an indoor temperature of the vehicle, a navigation function, a voice recognition function, a content play function, and a phone call function that are provided by the vehicle 100, with the certification information.

The control authority identification unit 120 identifies a control authority that corresponds to certification information that is received from the device 200. Additionally, the service information extraction unit 125 extracts service information, which corresponds to the identified control authority, from the DB 150. The control authority identification unit 120 may extract a list of services, which corresponds to the identified control authority, from the DB 150. For example, the control authority identification unit 120 may determine that a control authority, which corresponds to a certification key 'A', is a control authority of a main user, and extract a list of services including 'an automatic driving service' and 'a video clip play service'. Additionally, for example, the control authority identification unit 120 may determine that a control authority, which corresponds to a certification key 'B', is a control authority of a sub-user, and may extract a list of services including 'a video clip play service' and 'a navigation service'.

The service information providing unit 130 provides information about the extracted services to the device 200. The service information providing unit 130 may convert the extracted service list into a format that is appropriate for a protocol of the device 200, and may provide the converted service list to the device 200.

The apparatus information providing unit 135 provides apparatus information about a service, which is selected by the device 200, to the device 200. With regard to the service that is provided by the vehicle 100, various apparatuses in the vehicle 100 may be used. For example, apparatuses, such as a steering wheel, brakes, an accelerator, a camera, a display apparatus, a speaker, or an input apparatus, may be used. The apparatus information providing unit 135 may extract information about an apparatus, which is used for providing a service that is selected by the device 200, from the DB 150, and provide the extracted apparatus information to the device 200. For example, if a service, which is selected by the device 200, is 'an automatic driving service', the apparatus information providing unit 135 may provide information about a steering wheel, brakes, an accelerator, a camera, a display apparatus, or a speaker to the device 200. Additionally, for example, if a service, which is selected by the device 200, is 'a video clip play service', the apparatus information providing unit 135 may provide information about a display apparatus or a speaker to the device 200. Accordingly, the device 200 may receive apparatus information which corresponds to a control authority of the device 200, and control an apparatus that is included in the received apparatus information.

The application information providing unit 140 provides application information about the selected service to the device 200. The application information providing unit 140 may provide an application file, which is used for executing the selected service, to the device 200. However, the present disclosure is not limited thereto, and the application information providing unit 140 may provide predetermined link information, or any other similar and/or suitable type of address information, to the device 200, so that the device 200 may download an application file that is necessary for executing the selected service.

The output unit 145 outputs a result of the executing of a service that is executed by the device 200. The output unit 145 may output at least one of an image and sound, which are obtained by executing a service that is executed by the device 200, via a display apparatus and a speaker in the vehicle 100. Additionally, the output unit 145 operates an apparatus in the vehicle 100 based on a result, which is received from the device 200, of controlling the apparatus in the vehicle 100. However, the present disclosure is not limited thereto, and the device 200 may directly control an apparatus in the vehicle 100, not through the output unit 145.

The DB 150 stores various types of information so that the vehicle 100 may execute a service by using a processor of the device 200.

The transceiver 160 transmits or receives various types of information to and/or from the device 200 so that the vehicle 100 may execute a service by using the processor of the device 200.

The control unit 170 controls the connection unit 105, the control authority setting unit 110, the certification unit 115, the control authority identification unit 120, the service information extraction unit 125, the service information providing unit 130, the apparatus information providing unit 135, the application information providing unit 140, the output unit 145, the DB 150, the transceiver 160, any other elements and/or devices that may be used to operate and/or be included in the vehicle 100, so that the vehicle 100 may execute a service by using a processor of the device 200.

Figure 12:
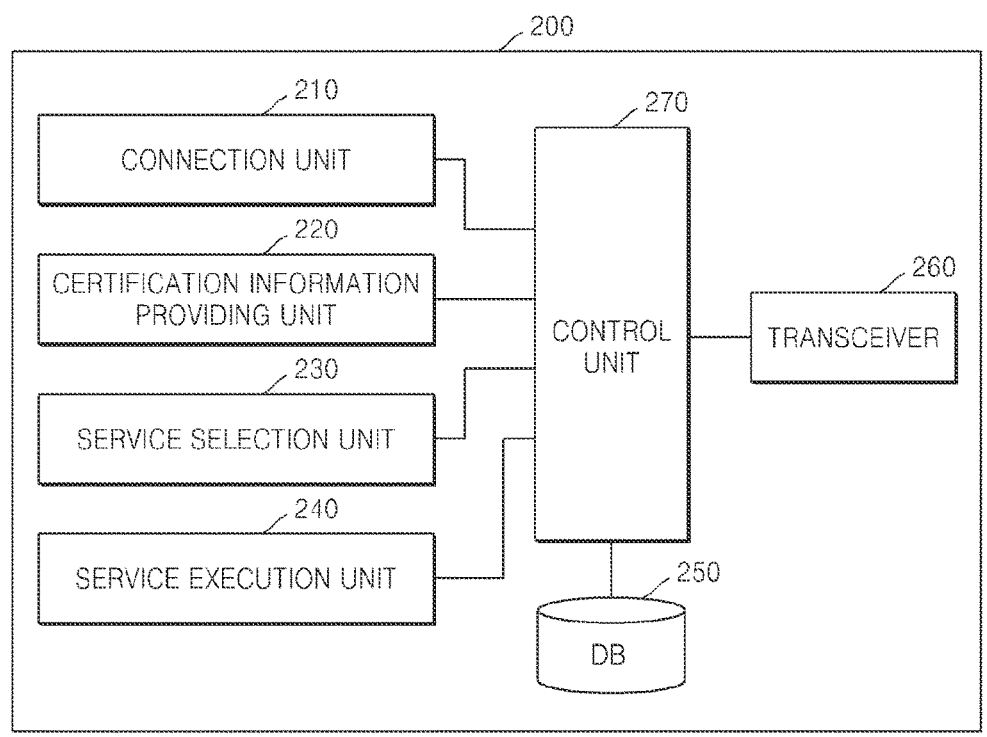
FIG. 12 is a block diagram of a device according to an embodiment of the present disclosure.

FIG. 12 is a block diagram of a device according to an embodiment of the present disclosure.

Referring to FIG. 12, according to an embodiment of the present disclosure, a device 200 includes a connection unit 210, a certification information providing unit 220, a service selection unit 230, a service execution unit 240, a DB 250, a transceiver 260, and a control unit 270. However, the device 200 is not limited thereto, and the device 200 may include any other elements and/or devices that may be used to operate and/or be included in the device 200.

The connection unit 210 connects the device 200 to the vehicle 100 for so that the device 200 and the vehicle 100 may communicate. When the device 200 is inserted into a slot, located near a dashboard of the vehicle 100, the connection unit 105 may connect the device 200 to the vehicle 100. However, the present disclosure is not limited thereto, and the device 200 may be connected to the vehicle 100 at any similar and/or suitable location.

The certification information providing unit 220 provides certification information to the vehicle 100. The certification information may be pre-issued by the vehicle 100 to the device 200 and may be stored in the device 200. As the device 200 and the vehicle 100 are connected to each other, the certification information may be provided from the device 200 to the vehicle 100.

Specifically, the vehicle 100 may request the device 200 for certification information, and in a response to the request, the device 200 may provide the certification information to the vehicle 100. The certification information may be information for certifying the device 200 or a user of the device 200. For example, the certification information may include at least one from among an ID of the device 200, a user ID, and a certification key. If there is no pre-issued certification key in the device 200, then the device 200 may provide an empty key to the vehicle 100.

The service selection unit 230 selects a predetermined service based on service information that is received from the vehicle 100. The service selection unit 230 may display the service information that is received from the vehicle 100, and may select a predetermined service based on a user input. For example, based on service information that is received from the vehicle 100, the service selection unit 230 may display a service list that includes 'an automatic driving service' and 'a video clip play service', and may select 'an automatic driving service' based on a user input. Alternatively, for example, based on service information that is received from the vehicle 100, the service selection unit 230 may display a service list that includes 'a video clip play service' and 'a navigation service', and select 'a video clip play service' based on a user input.

The service execution unit 240 executes a service via a processor of the device 200. Specifically, the service execution unit 240 may receive information about an apparatus in the vehicle 100, which is used for processing information about the selected service, and an application, which is used for processing information about the identified service, from the device 200. The apparatus in the vehicle 100 may include, for example, a steering wheel, brakes, an accelerator, a camera, a display apparatus, a speaker, or any other similar and/or suitable apparatus of the vehicle 100. Additionally, the information about an application may include an application file and a link address for downloading the application file, but the present disclosure is not limited thereto, and any suitable and/or similar information may be included in the information about an application.

Additionally, the service execution unit 240 may execute an application for the selected service, and may control apparatuses in the vehicle 100 via the executed application. For example, if a service, selected by the device 200, is 'an automatic driving service', then the service execution unit 240 may execute an application 'AA' for an automatic driving service, and may control a steering wheel, brakes, an accelerator, a camera, and any other similar and/or suitable apparatus in the vehicle 100. Additionally, the service execution unit 240 may output information about driving of the vehicle 100 via a display apparatus (not shown) or a speaker (not shown) in the vehicle 100.

Additionally, for example, if a service, which is selected by the device 200, is 'a video clip play service', the service execution unit 240 may execute an application 'BB' for a video clip play service, and output a result of the video clip play via a display apparatus (not shown) or a speaker (not shown) in the vehicle 100.

The DB 250 stores various types of information so that the device 200 may execute a service, which is provided by the vehicle 100, via a processor of the device 200.

The transceiver 260 transmits and receives various types of information to and/or from the vehicle 100, so that the device 200 may execute a service, which is provided by the vehicle 100, via a processor of the device 200.

The control unit 270 controls the certification information providing unit 220, the service selection unit 230, the service execution unit 240, the DB 250, and the transceiver 260, so that the device 200 may execute a service, which is provided by the vehicle 100, via a processor of the device 200, and any other elements and/or devices that may be used to operate and/or be included in the device 200.

The embodiment of the present disclosure may be implemented an the form of a recording medium that includes computer executable commands, such as program modules, being executed by a computer. Computer-readable media can be any available media that can be accessed by a computer and includes volatile, nonvolatile, removable, and non-removable media. In addition, the computer-readable media may include computer storage media and communication media. Computer storage media includes the volatile, non-volatile, removable, and non-removable media implemented as any method or technology for storage of information such as computer readable instructions, data structures, program modules, or other data. The medium of communication is typically computer-readable instructions, and other data in a modulated data signal such as data structures, program modules, or carrier waves, or other transport mechanism and includes any information transmission media.

The foregoing description of the present disclosure is for illustrative purposes, and it will be understood by those of ordinary skill in the art that various changes in form and details may be made therein without departing from the spirit and scope or essential features of the present disclosure. Therefore, it is to be understood that the embodiments, described above, are for illustrative purposes only and are not intended to be limiting of example embodiments. For example, each component, which is described in a singular form, may be executed in a distributed fashion. Likewise, components, which are described to be in a distributed form, can be carried out in combined form.

The scope of the disclosure is defined not by the detailed description of the disclosure but by the appended claims, and various changes in form and all differences within the scope will be construed as being included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a vehicle, the method comprising:
    generating, using a hardware processor of the vehicle, a first certification key about a first external device of a main user of the vehicle and a second certification key about a second external device of a sub-user of the vehicle;
    setting, using the hardware processor of the vehicle, a first control authority of the first external device based on the first certification key and a second control authority of the second external device based on the second certification key;
    determining whether an external device is the first external device or the second external device using a certification key of the external device connected to the vehicle;
    identifying, using the hardware processor of the vehicle, a service list to be provided by the vehicle corresponding to the first control authority or the second control authority, the service list stored in a memory of the vehicle;
    transmitting, using a transceiver of the vehicle, the service list and application information related to the service list to the external device connected to the vehicle;
    receiving, using the transceiver of the vehicle, identification information of a service selected by the external device among the service list from the external device connected to the vehicle;
    transmitting, using the transceiver of the vehicle, an application file from the vehicle to the external device, the application file used for executing the selected service;
    receiving, using the transceiver of the vehicle, a control information regarding the service from the external device connected to the vehicle;
    controlling, using the hardware processor of the vehicle, the service according to the identification information of the service and the control information regarding the service received from the external device connected to the vehicle, and
    providing the service using one or more components of the vehicle.

2. The method of claim 1, wherein the identifying of the control authority of the external device comprises receiving certification information from the external device and identifying a control authority that corresponds to the received certification information.

3. The method of claim 2, wherein the certification information comprises a key value for distinguishing the main user from the sub-user of a vehicle.

4. The method of claim 2, wherein the service may be at least one of a service regarding safety of the vehicle and a service for a convenience function that is provided by a vehicle, and
    if a user who corresponds to the received certification information is the main user of the vehicle, the control authority corresponding to the received certification information is an authority for controlling the service regarding safety of the vehicle.

5. The method of claim 4, wherein the service regarding the safety of the vehicle comprises a service that provides at least one of an automatic vehicle driving function and a drowsy driving prevention function, and
    wherein the service regarding the convenience function, which is provided by the vehicle, comprises a service for at least one of a function of adjusting an indoor temperature of the vehicle, a navigation function, a voice recognition function, a content play function, and a phone call function.

6. The method of claim 1, further comprising providing apparatus information to the external device, the apparatus information being about an internal apparatus of the vehicle for outputting a result of the executing of the selected service, and
    wherein a result of the executing of the selected service by using a processor of the external device is output by the internal apparatus of the vehicle.

7. An apparatus of a vehicle, the apparatus controlling a service and comprising:
    a transceiver configured to communicate with an external device;
    a memory, and
    a hardware processor configured to:
        generate a first certification key about a first external device of a main user of the vehicle and a second certification key about a second external device of a sub-user of the vehicle;
        set a first control authority of the first external device based on the first certification key and a second control authority of the second external device based on the second certification key;
        determine whether an external device is the first external device or the second external device using a certification key of the external device connected to the vehicle;
        identify a service list to be provided by the vehicle corresponding to the first control authority or the second control authority, the service list stored in the memory;
        control the transceiver to:
            transmit the service list and application information related to the service list to the external device connected to the vehicle,
            receive an identification value of a service selected by the external device based on the service list from the external device connected to the vehicle, transmit an application file from the vehicle to the external device, the application file used for executing the selected service, and receive a control information regarding the service from the external device connected to the vehicle, control the service according to the identification information of the service and the control information regarding the service received from the external device connected to the vehicle, and provide the service using one or more components of the vehicle.

8. The apparatus of claim 7, wherein the transceiver receives certification information from the external device and identifies a control authority that corresponds to the received certification information.

9. The apparatus of claim 8, wherein the certification information comprises a key value for distinguishing the main user from the sub-user of a vehicle.

10. The apparatus of claim 7, wherein the service may be at least one of services regarding safety of the vehicle and services for a convenience function that is provided by a vehicle, and if a user who corresponds to the received certification information is the main user of the vehicle, the control authority corresponding to the received certification information is an authority for controlling the service regarding safety of the vehicle.

11. The apparatus of claim 10, wherein the services regarding the safety of the vehicle comprises a service that provides at least one of an automatic vehicle driving function and a drowsy driving prevention function, and wherein the services regarding the convenience function, which is provided by the vehicle, comprises a service for at least one of a function of adjusting an indoor temperature of the vehicle, a navigation function, a voice recognition function, a content play function, and a phone call function.

* * * * *